(12) United States Patent
McArdle et al.

(10) Patent No.: US 7,973,119 B1
(45) Date of Patent: *Jul. 5, 2011

(54) ADHESIVE SYSTEMS USING IMINES AND SALTS THEREOF AND PRECURSURS TO ELECTRON DEFICIENT OLEFINS

(75) Inventors: Ciaran B. McArdle, Dublin (IE); Ligang Zhao, Goettingen (DE)

(73) Assignee: Loctite (R&D) Limited, Dublin (IE)

( * ) Notice: Subject to any disclaimer, the term of this patent is extended or adjusted under 35 U.S.C. 154(b) by 674 days.

This patent is subject to a terminal disclaimer.

(21) Appl. No.: 11/877,707

(22) Filed: Oct. 24, 2007

(51) Int. Cl.
C08G 77/04 (2006.01)

(52) U.S. Cl. ............. 528/25; 528/26; 528/28; 528/228; 528/229; 528/269; 528/332

(58) Field of Classification Search .................... 528/25, 528/26, 28, 228, 229, 269, 332
See application file for complete search history.

(56) References Cited

U.S. PATENT DOCUMENTS

| | | | |
|---|---|---|---|
| 2,363,464 A | 11/1944 | Senkus | |
| 2,413,249 A | 12/1946 | Senkus | |
| 2,413,250 A | 12/1946 | Senkus | |
| 2,415,046 A | 1/1947 | Senkus | |
| 2,582,128 A | 1/1952 | Hurwitz | |
| 2,721,858 A | 10/1955 | Joyner et al. | |
| 2,756,251 A | 7/1956 | Joyner et al. | |
| 2,763,677 A | 9/1956 | Jeremias | |
| 2,870,193 A | 1/1959 | Pollack et al. | |
| 3,048,615 A | 8/1962 | Fields | |
| 3,142,698 A | 7/1964 | Halpern et al. | |
| 3,282,773 A | 11/1966 | Wicker | |
| 3,554,987 A | 1/1971 | Smith | |
| 3,903,055 A | 9/1975 | Buck | |
| 3,975,422 A | 8/1976 | Buck | |
| 3,988,299 A | 10/1976 | Malofsky | |
| 3,995,641 A | 12/1976 | Kronenthal et al. | |
| 4,003,942 A | 1/1977 | Buck | |
| 4,012,402 A | 3/1977 | Buck | |
| 4,013,703 A | 3/1977 | Buck | |
| 4,056,543 A | 11/1977 | Ponticello | |
| 4,160,864 A | 7/1979 | Ponticello | |
| 4,202,920 A | 5/1980 | Renner et al. | |
| 4,364,876 A | 12/1982 | Kimura et al. | |
| 4,440,910 A | 4/1984 | O'Connor | |
| 4,512,357 A | 4/1985 | Earl | |
| 4,556,700 A | 12/1985 | Harris et al. | |
| 4,560,723 A | 12/1985 | Millet | |
| 4,587,059 A | 5/1986 | Harth et al. | |
| 4,622,414 A | 11/1986 | McKervey | |
| 4,636,539 A | 1/1987 | Harris et al. | |
| 4,695,615 A | 9/1987 | Leonard et al. | |
| 4,718,966 A | 1/1988 | Harris et al. | |
| 4,764,545 A | 8/1988 | Yoshida | |
| 4,837,260 A | 6/1989 | Sato et al. | |
| 4,855,461 A | 8/1989 | Harris | |
| 4,876,045 A | 10/1989 | Longo et al. | |
| 4,906,317 A | 3/1990 | Liu | |
| 5,142,098 A | 8/1992 | Bru-Magniez et al. | |
| 5,288,794 A | 2/1994 | Attarwala | |
| 5,306,752 A | 4/1994 | Attarwala | |
| 5,312,864 A | 5/1994 | Wenz et al. | |
| 5,328,944 A | 7/1994 | Attarwala et al. | |
| 5,340,873 A | 8/1994 | Mitry | |
| 5,386,047 A | 1/1995 | Nakos et al. | |
| 5,424,343 A | 6/1995 | Attarwala | |
| 5,424,344 A | 6/1995 | Lewin | |
| 5,455,369 A | 10/1995 | Meier et al. | |
| 5,624,699 A | 4/1997 | Lang | |
| 5,703,267 A | 12/1997 | Takahashi et al. | |
| 5,744,642 A * | 4/1998 | Lantzsch et al. | ............... 564/278 |
| 5,955,199 A * | 9/1999 | Johnson et al. | ............ 428/423.1 |
| 5,977,242 A * | 11/1999 | Origuchi et al. | ............... 524/521 |
| 5,994,464 A | 11/1999 | Ohsawa | |
| 6,093,780 A | 7/2000 | Attarwala | |
| 6,096,848 A | 8/2000 | Gololobov et al. | |
| 6,174,919 B1 | 1/2001 | Hickey | |
| 6,245,933 B1 | 6/2001 | Malofsky et al. | |
| 6,291,544 B1 | 9/2001 | Kotzev | |
| 6,531,460 B1 | 3/2003 | Takenouchi et al. | |
| 6,833,196 B1 | 12/2004 | Wojciak | |
| 6,835,789 B1 | 12/2004 | Kneafsey et al. | |
| 2006/0094833 A1 | 5/2006 | McDonnell et al. | |
| 2006/0269870 A1 | 11/2006 | Harada et al. | |
| 2008/0241249 A1 | 10/2008 | Quintero et al. | |

FOREIGN PATENT DOCUMENTS

| | | |
|---|---|---|
| DE | 2 626 173 | 12/1977 |
| DE | 40 34 080 A1 | 6/1991 |
| DE | 19519958 | 12/1995 |
| EP | 0 127 855 | 12/1984 |
| EP | 0 267 981 A | 5/1988 |
| EP | 0 459 617 A1 | 12/1991 |
| WO | WO 94/15590 A1 | 7/1994 |
| WO | WO 94/15907 | 7/1994 |
| WO | WO 95/32183 | 11/1995 |
| WO | WO 99/14206 A1 | 3/1999 |
| WO | WO 03/006225 A1 | 1/2003 |

(Continued)

OTHER PUBLICATIONS

Carl J. Buck, Unequivocal Synthesis of Bis(2-Cyanoacrylate) Monomers, I. Via Anthracene Adducts, *Journal of Polymer Science, Polymer Chemistry Edition*, vol. 16, 2475-507 (1978).

G. Jones, "The Knoevenagle Condensation", *Organic Reactions*, vol. XV, 204, Wiley New York (1967).

F. Bigi et al., "Montmorillonite KSF as an Inorganic, Water Stable, and Reusable Catalyst for the Knoevenagel Synthesis of Coumarin-3-carboxylic Acids", *Journal Organic Chemistry*, vol. 64, 1033-35 (1999).

B. Green et al., Synthesis of Steroidal 16, 17-Fused Unsaturated β-Lactones[1], *Journal Organic Chemistry*, vol. 50, 640-44 (1985).

P. Rao et al., "Zinc Chloride as a New Catalyst for Knoevenagel Condensation", *Tetrahedron Letters*, vol. 32, No. 41, 5821-22 (1991).

J. S. Yadav et al., "Phosphane-Catalyzed Knoevenagel Condensation: A Facile Synthesis of Cyanoacrylates and α-Cyanonitriles", *European Journal Organic Chemistry*, 546-51 (2004).

L. Tietze et al., Comprehensive Organic Synthesis, Pergamon Press, Oxford, vol. 2, Chapter 1.11, 341 (1991).

(Continued)

*Primary Examiner* — Bernard Lipman
(74) *Attorney, Agent, or Firm* — Steven C. Bauman (57) ABSTRACT

This invention relates to adhesive systems using imines and salts thereof and precursors to electron deficient olefins.

10 Claims, 4 Drawing Sheets

FOREIGN PATENT DOCUMENTS

WO     WO 03/086605 A2     10/2003

OTHER PUBLICATIONS

P. Laszlo, "Catalysis of Organic Reactions by Inorganic Solids", *Accounts of Chemical Research*, vol. 19, 121-27 (1986).

K. Kloestra et al., "Base and Acid Catalysis by the Alkali-containing MCM-41 Mesoporous Molecul Sieve", *Journal Chemical Soc. Chem. Commun.*, 1005-06 (1995).

P. Lednor et al., "The Use of a High Surface Area Silicon Oxynitride as a Solid, Basic Catalyst", *Journal Chemical Society, Chem. Commun.*, 1625-26 (1991).

F. Bigi et al., "A Revision of the Biginelli Reaction Under Solid Acid Catalysis. Solvent-free Synthesis of Dihydropyrimidines Over Montmorillonite KSF", *Tetrahedron Letters*, vol. 40, 3465-68 (1999).

F. Bigi et al., "Clean synthesis in water: uncatalysed preparation of ylidenemalononitriles", *Green Chemistry*, vol. 2, 101-03 (2000).

R. Breslow, "Hydrophobic Effects on Simple Organic Reactions in Water", *Accounts of Chemical Research*, vol. 24, 159-64 (1991).

C. Li "Organic Reactions in Aqueous Media—With a Focus on Carbon-Carbon Bond Formation", *Chemical Reviews*, vol. 93, 2023-35 (1993).

T. Welton, "Room Temperature Ionic Liquids. Solvents for Synthesis and Catalysis", *Chemical Reviews*, vol. 99, 2071-83 (1999).

D, Morrison et al., "Base-promoted reactions in ionic liquid solvents. The Knoevenagel and Robinson annulation reactions", *Tetrahedron Letters*, vol. 42, 6053-55 (2001).

Fraga-Dubreiul et al., "Grafted ionic liquid-phase-supported synthesis of small organic molecules", *Tetrahedron Letter*, vol. 42, 6097-6100 (2001).

M, Smietana et al., "Preparation of Silyl Enol Ethers Using (Bistrimethylsilyl)acetamide in Ionic Liquids", *Organic Letters*, vol. 3, No. 7, 1037-39 (2001).

Li et al., "n-Butyl Pyridinium Nitrate as a Reusable Ionic Liquid Medium for Knoevenagel Condensation", *Chinese Chemical Letters*, vol. 14, No. 5, 448-50 (2003).

J. Harjani et al., "Lewis acidic ionic liquids for the synthesis of electrophilic alkenes via the Knoevenagel condensation", *Tetrahedron Letters*, vol. 43, 1127-30 (2002).

Xu et al., "Knoevenagel condensation Reaction Catalyzed by Functionalized Ionic Liquid 1-(2-Hydroxyethyl)-3-methyl Imidazolium Chloride", *Chinese Journal of Organic Chemistry*, vol. 24(10), 1253-56 (2004).

Su et al., "Organic Reactions in Ionic Liquids: Knoevenagel Condensation Catalyzed by Ethylenediammonium Diacetate", *Synthesis 2003*, No. 4, 555-59 (2003).

Moehrle et al., "Aminomethylierung von 1,3-Diketonen", *Pharmazie*, vol. 40, 697-701 (1985).

J. March, "Reactions", *Advanced Organic Chemistry*, 3rd Edition, Wiley & Sons Inc., 417 (1985).

J. March, "Addition to Carbon-Hetero Multiple Bonds", *Advanced Organic Chemistry*, 3rd Edition, Wiley & Sons, 802-03 (1985).

M. B. Smith, *Organic Synthesis*, McGraw Hill International Chemistry Series, 1302 (1994).

Tehrani et al., "Product Class 8: Iminium Salts", *Science of Synthesis*, vol. 27, 313-48 (2004).

B. Hin et al., "Facile Synthesis of α-Substituted Acrylate Esters", *Journal of Organic Chemistry*, vol. 67, 7365-68 (2002).

Holy et al., "The Mannich Reaction-II Derivatization of Aldehydes and Ketones Using Dimethyl(methylene)ammonium Salts", *Tetrahedron Letters*, vol. 35, 613-19 (1979).

Bryson et al., "Preformed Mannich Salts: A Facile Preparation of Dimethyl(methylene)ammonium Iodide", *Journal of Organic Chemistry*, vol. 45, 524-25 (1980).

J. March, "The Pinacol Rearrangement", *Advanced Organic Chemistry*, 3rd Edition, Wiley & Sons, 963-64 (1985).

J. March, "Free-Radical Substitution", *Advanced Organic Chemistry*, 3rd Edition, Wiley & Sons, 642 (1985).

Jahn et al., "A Novel and Simple Method for the Preparation of Iminium Salts", *Tetrahedron Letters*, vol. 34, No, 37, 5863-66 (1993).

R. J. Vijin et al., Synthesis, 573 (1994).

Davis, "Chemistry Letters", vol. 33, Issue 9, 1072-77 (2004).

Davis et al., "Ionic Liquids in Synthesis", P. Wasserscheid and T. Welton, eds., Wiley-VCH Verlag GmbH & Co. KGaA, Chapter 2 (2002).

M.G. Djamali, P. Burba, K.H. Lieser, "Snythese und Eigenschaften eines Celluloseaustauschers mit Diaminodibenzo-18-Krone-6 als Ankergrupper", Die Angewandte Makromolecular Chemie, vol. 92, 145-54 (1980).

K. Babic, "Reactive and Functional Polymers", vol. 66, 1494-1505 (2006).

Trumbo et al., "Copolymerization Behavior of 3-lsopropenyl-α,α-Dimethylbenzylamine and Preliminary Evaluation of the Copolymers in Thermoset Coatings", *Journal of Applied Polymer Science*, vol. 82, 1030-39 (2001).

T. Giesenberg et al., "Synthesis and Functionalization of a New Kind of Silica Particle." *Agnew. Chem. Int. Ed.*, 43, 5697-5700 (2004).

Zhang et al., "An Investigation of Knoevenagel condensation reaction in microreactors using a new.zeolite catalyst", *Applied Catalysis A: General*, 261, 109-118 (2004).

Mehnert et al., "Chemical Communications", 3010 (2002).

Lee and Lee, "Bulletin of the Korean Chemical Society", vol. 25, Issue 10, 1531-37 (2004).

H. R. Snyder and W. E. Hamlin, "Alkylation of Nitroparaffins with Amines and Their Derivatives", *Journal of American Chemical Society*, vol. 72, 5082-85 (1950).

H. G. Johnson, "Reaction of Aliphatic Amines with Formaldehyde and Nitroparaffins. II. Secondary Amines", *Journal of American Chemical Society*, vol. 68, 12-14 (1946).

M. Semkus, "Journal of the American Chemical Society", vol. 68, 10-12 (1946).

Sarac, "Progress in Polymer Science", vol. 24, 1149-1201 (1999).

Brough et al., "Pyrimidinyl Nitronyl Nitroxides", *Chemical European Journal*, vol. 12, 5134 (2006).

Zhou et al., *J. Polym. Sci., Part A Polym. Chem. Ed.*, 29, 1097 (1991).

Mehrotra et al., "Journal of Organometalic Chemistry", vol. 24, 611-21 (1970).

Son et al., "Synthesis of Hexahydro-3,3,5,5,7-pentaalky1-2H-1,4-diazepin-2-ones from 1,3-Diamines and Ketones", *J. Org. Chem.*, vol. 46, 323 (1981).

Senkus, Acetals of Nitro Alcohols and Corresponding Amino Acetals, *J. Amer. Chem. Soc.*, vol. 69, 1380-81 (1947).

Renner et al., "Cure of Epoxy Resins with Esters of Cyanoacrylic Acid", *Journal of Polymer Science: Polymer Chemistry Edition*, vol. 23, 2341 (1985).

Kennedy et al., "Macromers by Carbocationic Polymerization. X. Synthesis, Characterization, and Polymerizability of Cyanoacrylate-Capped Polyisobutylenes", *Journal of Macromolecular Science, Part A*, 28:2, 209-24 (1991).

Khrustalev et al., "Synthesis and X-ray structural study of 1-adamantylmethy 2-cyanoacrylatel and 1,10-decanediol bis-2cyanoacrylate", *Russian Chemical Bulletin*, vol. 45, No. 9, 2172 (1996).

Y. Gololobov et al., "A novel approach to the synthesis of bis(2-cyanoacrylates)", *Russian Chemical Bulletin*, vol. 42, No. 5, 961 (1993).

Y. Gololobov et al., "Synthesis of bis(2-cyanoacrylates) from 2-cyanoacryloyl chloride and 2-butene-and 2-butyne-1,4-diols", *Russian Chemical Bulletin*, vol. 44, No. 4, 760 (1995).

J.-L. De Keyser et al., "A Versatile and Convenient Multigram Synthesis of Methylidenemalonic Acid Diesters", *J. Org. Chem.*, vol. 53, 4859 (1988).

Vijayalakshmi et al., "Alkyl and substituted alkyl 2-cyanoacrylates. Part I. Synthesis and Properties", *J. Adhesion Science Technology*, vol. 4, No. 9, 733 (1990).

Guseva et al., "Organic Chemistry. Synthesis of functionality substituted cyanoacetates." *Russian Chemical Bulletin*, vol. 42, No. 3, 478 (1993).

Guseva et al., "Organic Chemistry" *Russian Chemical Bulletin*, vol. 43, No. 4, 595 (1995).

Gololobov and Gruber, Russian Chemical Review, vol. 66, Issue 11, 953 (1997).

Senchenya et al., "Silicon-containing esters of α-cyanoacrylic acid: synthesis and properties" *Russian Chemical Bulletin*, vol. 42, No. 5, 909 (1993).

Bowie J. H. et al., "Tetrahedron", vol. 23, 305-20 (1967).

J. S. Norwick et al., J. Org. Chem., 57(28), 7364-66 (1992).

International Search Report for International Patent Application No. PCT/EP2008/064489 dated Dec. 30, 2008.

International Search Report for International Patent Application No. PCT/EP2008/064490 dated May 4, 2009.

International Search Report for International Patent Application No. PCT/EP2008/064488 dated Jul. 16, 2009.

H.C. Haas, et al., "Carbamylmethyl Esters of Unsaturated Acids"; Journal of Polymer Science; vol. XXXVII, Issue 131; pp. 317-319; 1959.

J.L. De Keyser et al., "A versatile and convenient multigram synthesis of methylidenamalonic acid diesters", J. Org. Chem., pp. 4859-48562, (1988) (XP002518681)

D.A. Aronovich, et al.; J. Appl. Chem. USSR.; vol. 52, pp. 900-902; 1979 (XP002518682).

X. Yang; Organic Preparations and Procedures International; vol. 30, No. 2; pp. 239-242; 1998 (XP002518684).

P.H. Mason, et al., "A New Route to Substituted Glutaric Acid Derivatives From Allylic Malonates"; Synthetic Communications; vol. 25(2); pp. 183-190; 1995.

T. Sato, et al., "Synthesis of Copper (II) Chelate of ethyl a-(acetoacetoxymethyl)acrylate and its Radical-Initiated Polymerization", Makromol. Chem., Rapid Commun. vol. 11; pp. 553-557; 1990.

M.L. Meketa, et al., "An Efficacious Method for the Halogenation of .beta.-dicarbonyl Compounds Under Mildly Acidic Conditions"; Tetrahedron Letter; vol. 46(28); pp. 4749-4751; 2005, XP002520970.

R.C. Cookson, et al., "2-Phenylthioallyl Alcohols and Their Use in The Synthesisi of 1,4-diketones and Cyclopentenones"; Journal of Chemical Society, Chemical Communications; (23); p. 990; 1976, XP002520969.

P.H. Mason, et al., "Some Mechanistic and Synthetic Aspects of the DABCO Catalyzed Rearrangement of Allylic Esters"; Tetrahedron; vol. 50(41); pp. 12001-12008, XP002520967.

L.S. Boguslavskaya, et al., Journal of Organic Chemistry; vol. 9; pp. 295-299; 1793, XP002520972.

Samantha, et al., "Effect of Addition of Various Acrylates on the Performance of Ethyl Cyanoacrylate Adhesive", Polym.—Plast. Technol. Eng., 39(2), 381-92, (2000).

Vijayalakshm, et al., "Synthesis and End Use Evaluation of Pinene-based Alicyclic Acrylates", *J. Polym. Mat.*, 13, pp. 127-131 (1996).

Yamada, et al., "Determination of Absolute Rate Constants for Radical Polymerization and Copolymerization of Ethyl α-Cyanoacrylate in the Presence of Effective Inhibitors against Anionic Polymerization", Makromol. Chem., 184, 1025 (1983).

Vijayalakshmi, et al., "Synthesis of 3-Substituted-2-cyanoacrylates: Their Evaluation as Cross-link in Cyanoacrylate Adhesive Compositions", *J. Polym. Mat.*, 49, 1387 (1993).

Ponticello, "The Preparation of a-Substituted Acrylic Esters", *J. Polym. Sci., Polym. Chem. Edn.*, 17, pp. 3509-3518 (1979).

Pines, Alul and Kolobieski, "Bromination of a-Methylstyrene with N-Bromosuccinimide, Synthesis of 2-Phenyl-1,5-hexadiene", *J. Org. Chem.*, 22, 1113 (1957).

* cited by examiner

FIG. 1

EWG = electron withdrawing group

ADHESIVE SYSTEMS USING IMINES AND SALTS THEREOF AND PRECURSORS TO ELECTRON DEFICIENT OLEFINS

BACKGROUND OF THE INVENTION

1. Field of the Invention

This invention relates to adhesive systems using imines and salts thereof and precursors to electron deficient olefins.

2. Brief Description of Related Technology

Cyanoacrylate adhesives are known for their fast adhesion and ability to bond a wide variety of substrates. They are marketed as "super glue" type adhesives. They are useful as an all-purpose adhesive since they are a single component adhesive, very economical as only a small amount will do, and generally do not require any equipment to effectuate curing.

Traditionally, cyanoacrylate monomers have been produced by way of a Knoevenagel condensation reaction between a formaldehyde precursor, such as paraformaldehyde, and an alkyl cyanoacetate with a basic catalyst. During the reaction, cyanoacrylate monomer forms and polymerises in situ to a prepolymer. The prepolymer is subsequently thermally cracked or depolymerised, yielding cyanoacrylate monomer. This approach has remained essentially the same over time, though various improvements and variants have been introduced. See e.g. U.S. Pat. Nos. 6,245,933, 5,624,699, 4,364,876, 2,721,858, 2,763,677 and 2,756,251.

In U.S. Pat. No. 3,142,698, the synthesis of difunctional cyanoacrylates using a Knoevenagel condensation reaction is described. However, the ability to thermally depolymerise the resulting, now crosslinked, prepolymer in a reliable and reproducible mariner to produce pure difunctional monomers in high yields is questionable [see J. Buck, *J. Polym. Sci., Polym. Chem. Ed.*, 16, 2475-2507 (1978), and U.S. Pat. Nos. 3,975,422, 3,903,055, 4,003,942, 4,012,402, and 4,013,703].

A variety of other processes for producing cyanoacrylate monomers are known, some of which are described below. For instance, U.S. Pat. No. 5,703,267 defines a process for producing a 2-cyanoacrylic acid which comprises subjecting a 2-cyanoacrylate and an organic acid to a transesterification reaction.

U.S. Pat. No. 5,455,369 defines an improvement in a process for preparing methyl cyanoacrylate, in which methyl cyanoacetate is reacted with formaldehyde to form a polymer that is then depolymerized to the monomeric product, and in which the purity of yield is 96% or better. The improvement of the '369 patent is reported to be conducting the process in a poly(ethylene glycol) diacetate, dipropionate, or dibutyrate, having a number average molecular weight of 200-400, as the solvent.

U.S. Pat. No. 6,096,848 defines a process for the production of a biscyanoacrylate, which comprises the steps of esterifying a 2-cyanoacrylic acid or transesterifying an alkyl ester thereof to obtain a reaction mixture; and fractionally crystallizing the reaction mixture to obtain the biscyanoacrylate.

U.S. Pat. No. 4,587,059 defines a process for the preparation of monomeric 2-cyanoacrylates comprising the steps of (a) reacting (i) a 2,4-dicyanoglutarate with (ii) formaldehyde, cyclic or linear polymers of formaldehyde, or a mixture thereof, in the presence of between about 0.5 and about 5 mols of water per mol of 2,4-dicyanoglutarate, at an acid pH of about 3 to slightly less than 7, and at a temperature of about 70 to about 140, to form an oligomeric intermediate product, and (b) removing water that is present from step (a) and thermolyzing the oligomeric intermediate product for a period of time sufficient to effect its conversion to monomeric 2-cyanoacrylates.

Commercial production of cyanoacrylate monomers ordinarily relies on the depolymerisation of a prepolymer formed under Knoevenagel condensation reaction conditions, as noted above. Still today the Knoevenagel condensation reaction is believed to remain the most efficient and prevalent commercial method for producing high yields of monofunctional cyanoacrylates. Nevertheless, it would be desirable to not have to resort to thermally induced depolymerisation of a prepolymer produced by the Knoevenagel condensation reaction. This prospect may also enable facile access to highly useful difunctional monomers, such as so-called bis-cyanaocrylates or hybrid materials of cyanoacrylate and other polymerisable or reactive functionality.

Moreover, being able to generate mono cyanoacrylate or multifunctional cyanoacrylate or related monomers for instance in an in situ manner without resort to Knoevenagel condensation reaction conditions would be quite beneficial because it would enable a system that provides essentially a "cyanoacrylate or related monomers on demand". If the precursors to such mono or multifunctional cyanoacrylate monomers in such a system could be formulated with additional components ordinarily being incompatible with cyanoacrylates and such like, a considerable advance in instant adhesive technology could be realized. And it would be quite advantageous if such a system could provide a physical property profile not otherwise attainable from conventional cyanoacrylate formulations alone. Such a system has remained absent from the published literature, until now.

SUMMARY OF THE INVENTION

Unlike the state of the technology, the present invention provides a method by which electron deficient olefins, such as cyanoacrylate monomers, may be generated in situ and used in adhesive systems.

In one aspect of the invention, the method is conveniently employed in an adhesive system, where two parts are provided and after dispensing and mixing, an adhesive, containing the electron deficient monomer, is generated.

More specifically, in the two part adhesive system, a first part comprising an imine and a second part comprising a compound containing at least one methylene linkage having at least one electron withdrawing substituent attached thereto, are dispensed and mixed together. The electron withdrawing substituent may be selected from nitrile, carboxylic acids, carboxylic esters, sulphonic acids, ketones or nitro, and where two electron withdrawing substituents are present on the methylene linkage and when they are a nitrile and a carboxylic ester, a cyanoacrylate is formed after dispensing and mixing.

The imine is embraced within structure I as follows:

where K is where $R_1$-$R_2$ are each independently selected from hydrogen, alkenyl, or alkynyl; and A-B are each independently selected from linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from a linear, branched or cyclic hydrocarbon with or without one or more nitrogen-containing substituents thereon, a heterocyclic, an aromatic or an organosiloxane group or part thereof or linkage; and $R_3$ is selected from a hydrocarbon, a heterocyclic, an aromatic or an organosiloxane group or linkage;

w is 1-100; y is 1-100 and z is 0-100.

When more than one of K, E or $R_3$ are present, each instance thereof is defined independently from the other instance(s).

The imine more specifically is embraced within structure IA as follows:

IA where $R_1$-$R_2$, E, $R_3$, w, y and z are as defined above.

The iminium salt of IA is embraced within structure II as follows:

II where $K^+$ is where $R_1$-$R_2$ are each independently selected from hydrogen, alkenyl, or alkynyl; and A-B are each independently selected from linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from a linear, branched or cyclic hydrocarbon with or without one or more nitrogen-containing substituents thereon, a heterocyclic, an aromatic or an organosiloxane group or part thereof or linkage; and

$R_3$ is selected from a hydrocarbon, a heterocyclic, an aromatic or an organosiloxane group or linkage;

w is 1-100; y is 1-100 and z is 0-100; and

X is an anion.

When more than one of K, E or $R_3$ are present, each instance thereof is defined independently from the other instance(s).

The iminium salt is embraced more specifically by structure IIA as follows:

IIA where $R_1$-$R_2$, A-B, E, $R_3$, w, y and z, and X are as defined above.

The imine in some cases may be an imine having an onium salt, such as an ammonium or amine salt functionality.

In some cases the imines may be termed an "ionic liquid" (or "IL") or a task specific ionic liquid (or, "TSIL"), as will be discussed in more detail below.

In such cases where the imine of structure I or the iminium salt of structure II is particularly stable at room temperature conditions when in the presence of the precursor to the electron deficient olefin, a modest amount of heat may be useful to allow the reaction to generate electron deficient olefins, prior to cure thereof. Exposure to elevated temperature conditions is particularly desirable with iminium salts of structure II.

In other cases the imine or iminium salt may be tethered to a support, as is explained in more detail below. The support may be part of the packaging in which the components of the adhesive system are contained. Or, the support may be part of an additive, such as a filler or a fiber, used in the adhesive system.

The compound with which the imine or iminium salt reacts to form an electron deficient olefin is a precursor thereto and contains at least one methylene linkage having at least one electron withdrawing substituent attached thereto, where the electron withdrawing substituent is selected from nitrile, carboxylic acids, carboxylic esters, sulphonic acids, ketones or nitro.

In one aspect, the inventive process for the preparation of a reactive adhesive composition, includes the following steps:

(a) providing in one part an imine within structure I;

(b) providing in a second part a compound containing at least one methylene linkage having at least one electron withdrawing substituent attached thereto, where the electron withdrawing substituent is selected from nitrile, carboxylic acids, carboxylic esters, sulphonic acids, ketones or nitro; and (c) mixing the first part and the second part under appropriate conditions and for a time sufficient to yield an adhesive composition comprising a reactive electron deficient olefin.

In another aspect, the inventive process for the preparation of a reactive adhesive composition, includes the following steps:

providing in one part an iminium salt within structure II;

providing (in the same part or another part) a compound containing at least one methylene linkage having at least one electron withdrawing substituent attached thereto, where the electron withdrawing substituent is selected from nitrile, carboxylic acids, carboxylic esters, sulphonic acids, ketones or nitro; and either:

in the case of a one part system exposing the system to elevated temperature conditions or in the case of a two part system mixing the two parts under appropriate conditions, for a time sufficient to yield an adhesive composition comprising a reactive electron deficient olefin.

In an alternative aspect, a process for the preparation of a reactive adhesive composition is provided, steps of which comprise providing in one part an imine having a tertiary carbon atom attached to the imine nitrogen;

providing in a second part a precursor to a reactive deficient olefin selected from alkyl cyanoacetates or dialkyl malonates; and mixing the first part and the second part under appropriate conditions and for a time sufficient to yield a reactive adhesive composition.

In these processes, an imine or iminium salt is used as a reactant to yield the electron deficient olefin. The imine may have an onium such as an ammonium or amine salt functionality, as noted above. Alternatively, or additionally, as noted above and discussed in more detail below the imine or iminium salt may be tethered to a support.

In any of these aspects, the adhesive systems may include added catalyst or a modest amount of heat.

DETAILED DESCRIPTION OF THE INVENTION

As noted above, the present invention provides a two part adhesive system, in which:

a first part comprises the imine embraced within structure I as follows:

I where K is where $R_1$-$R_2$ are each independently selected from hydrogen, alkenyl, or alkynyl; and A-B are each independently selected from linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups; E is selected from a linear, branched or cyclic hydrocarbon with or without one or more nitrogen-containing substituents thereon, a heterocyclic, an aromatic or an organosiloxane group or part thereof or linkage; and

$R_3$ is selected from a hydrocarbon, a heterocyclic, an aromatic or an organosiloxane group or linkage;

w is 1-100; y is 1-100 and z is 0-100; and a second part comprises a compound containing at least one methylene linkage having at least one electron withdrawing substituent attached thereto, where the electron withdrawing substituent is selected from nitrile, carboxylic acids, carboxylic esters, sulphonic acids, ketones or nitro.

When more than one of K, E or $R_3$ are present, each instance thereof is defined independently from the other instance(s).

The imine more specifically is embraced within structure IA as follows:

IA where $R_1$-$R_2$, A-B, E, $R_3$, w, y and z are as defined above.

Desirably, in structure I w is 2, y is 1 and z is 1.

Desirably, in structure I $R_3$ comprises a N-containing linkage or group, a P-containing linkage or group, or a S-containing linkage or group. Alternatively, structure I $R_3$ comprises a polymer structure such as a polyorganosiloxane linkage or group.

More specifically, in structure I $R_3$ may include aliphatic hydrocarbons with chain lengths of $C_2$-$C_{12}$, linear or branched, or aliphatic cyclic hydrocarbons, such as may be derived from cyclohexane, cyclohexene, norbornenes or fused ring systems, polyethylene oxide segments, aromatic hydrocarbons, such as bisphenol A and bisphenol F, polymeric and copolymeric backbones derived from (meth)acrylates, styrene, acrylonitrile, acrylamides, polyisobutylenes, polymers or copolymers bearing pendent moieties capable of further polymerization, such as pendant (meth)acrylates, epoxides, isocyanates, vinyls, acetylenes, and inorganic polymers including polysiloxanes and derivitised polysiloxanes including those with pendant polymerisable groups.

The adhesive system may also include in the first part an imine within structure III

III where $R_4$-$R_5$ are each independently selected item hydrogen, alkenyl, or akynyl; and $R_6$ is a hydrocarbon moiety comprising a tertiary carbon which is attached to the N atom, where the tertiary carbon atom is attached to or forms part of one or more substituents selected from linear, branched, or cyclic alkyl or alkenyl groups, or one or more taken together form a cyclic or polycyclic (as the case may be) alkyl or alkenyl structure, which itself (themselves) may have substituents attached thereto. The addition of an imine within structure III to the first part of the adhesive system may assist in increasing the speed of the reaction between the first part and the second part when those parts are mixed together, such as when they are dispensed from separate containers or separate chambers within the same container.

In the adhesive system, the compound (which may be thought of as a precursor to the electron deficient olefin) may contain a methylene linkage, desirably at least two methylene linkages, each of which having at least two electron withdrawing substituent attached thereto.

Alternatively, instead of an imine within structure I, an iminium salt within structure II as follows:

II where $K^+$ is where $R_1$-$R_2$ are each independently selected from hydrogen, alkenyl, or alkynyl; and A-B are each independently selected from linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from a linear, branched or cyclic hydrocarbon with or without one or more nitrogen-containing substituents thereon, a heterocyclic, an aromatic or an organosiloxane group or part thereof or linkage; and $R_3$ is selected from a hydrocarbon, a heterocyclic, an aromatic or an organosiloxane group or linkage;

w is 1-100; y is 1-100 and z is 0-100; and

X is an anion, may be mixed with the second part of the previously described system to form a one part adhesive system.

More specifically, the iminium salt within structure II may embrace the iminium salt within structure IIA:

IIA where $R_1$-$R_2$, A-B, E, $R_3$, w, y, z and X are as defined above,

The iminium salt within structure IIA may be in the form of an IL having a melting point less than 100° C., which in its molten form contains only ions. The IL is also not distillable at a pressure of 1 mBar and a temperature of 100° C. The IL is in the liquid state at a temperature in the range of −10° C. to +250° C., such as in the range of 15° C. to +250° C., desirably in the range of 50° C. to +150° C.

In another aspect, the present invention provides a process for the preparation of a reactive adhesive composition. This process includes the steps of:

(a) providing in one part an imine within structure I;

(b) providing in a second part a compound containing at least one methylene linkage having at least one electron withdrawing substituent attached thereto, where the electron withdrawing substituent is selected from nitrile, carboxylic acids, carboxylic esters, sulphonic acids, ketones or nitro; and (c) mixing the first part and the second part under appropriate conditions and for a time sufficient to yield an adhesive composition comprising a reactive electron deficient olefin.

in an alternative to that aspect, the present invention provides a process for the preparation of a reactive adhesive composition. This process includes the steps of: providing an iminium salt within structure II; and a compound containing at least one methylene linkage having at least one electron withdrawing substituent attached thereto, where the electron withdrawing substituent is selected from nitrile, carboxylic acids, carboxylic esters, sulphonic acids, ketones or nitro and exposing the iminium salt and the compound as so described to appropriate conditions and for a time sufficient to yield an adhesive composition comprising a reactive electron deficient olefin.

In another aspect, the present invention provides a process for the preparation of a reactive adhesive composition. The process includes the steps of:

(a) providing in one part an imine having a tertiary carbon atom attached to the imine nitrogen;

(b) providing in a second part a precursor to a reactive electron deficient olefin selected from alkyl cyanoacetates and/or dialkyl malonates; and

(c) mixing the first part and the second part under appropriate conditions and for a time sufficient to yield a reactive adhesive composition.

In these processes, desirably the compound containing at least one methylene linkage having at least one electron withdrawing substituent attached thereto comprises at least one ester of cyanoacetic acid or a half ester derived from malonic acid. These acids once esterified may contain moieties such as aliphatic hydrocarbons with chain lengths of $C_2$-$C_{12}$, linear or branched, or aliphatic cyclic hydrocarbons such as derived from cyclohexane, cyclohexene, norbornenes or fused ring systems, polyethylene oxide segments, aromatic hydrocarbons, such as bisphenol A and bisphenol F, polymeric and copolymeric backbones derived from (meth)acrylates, styrene, acrylonitriles, acrylamides, polyisobutylenes, or polymers or copolymers bearing pendant moieties capable of further polymerization, such as pendant (meth)acrylates, epoxides, isocyanates, vinyls, acetylenes, and inorganic polymers including polysiloxanes and derivitised polysiloxanes including those with pendant polymerisable groups.

Figure 4:
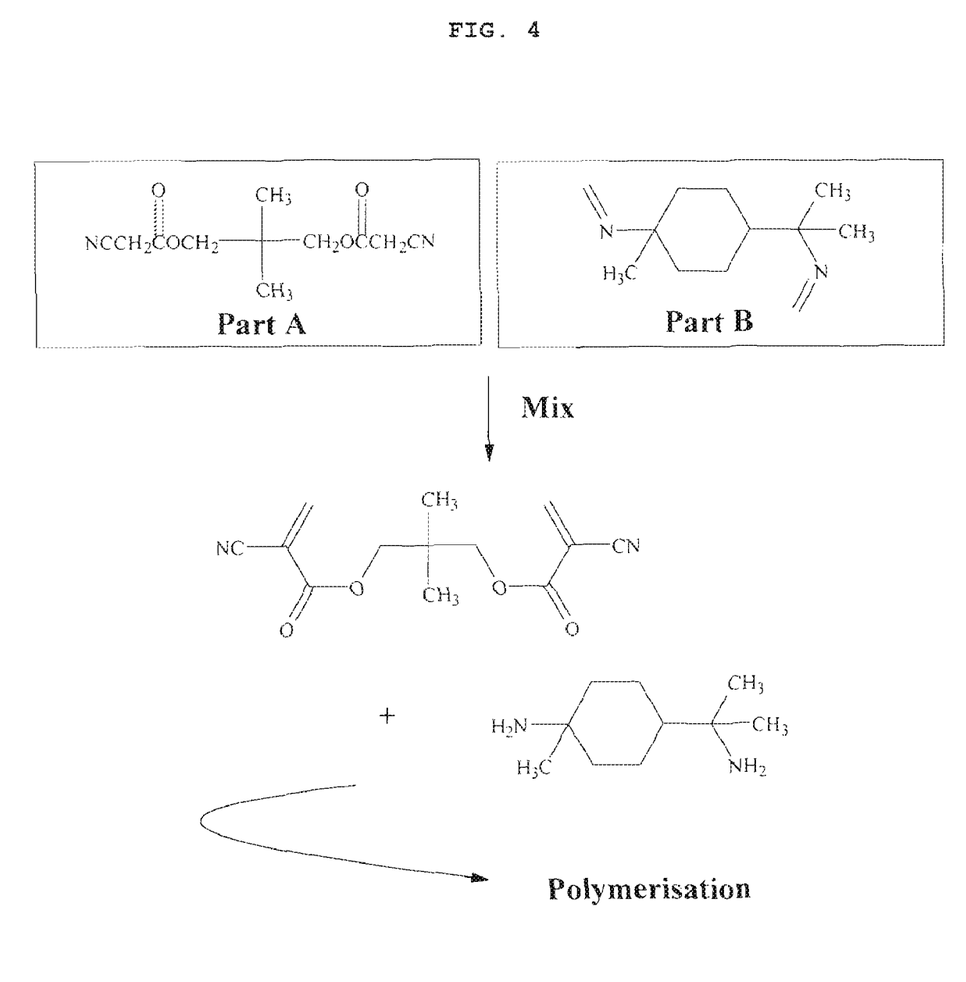
FIG. 4 depicts a schematic of a two part adhesive system comprising Part A comprising a precursor to an electron deficient olefin and Part B comprising an imine or iminium salt (latter not shown for clarity), each contained separately in individual barrels of a dual syringe. After expression and mixing (with or without added catalyst or heat), the reactive adhesive is formed.

In this regard, the compound containing at least one methylene linkage having at least one electron withdrawing substituent attached thereto may contain functionality as defined for $R_3$ in the imines or iminium salt described in structures I and II, respectively. However, different combinations will also be possible here. For example, structure I may contain an $R_3$ based on a bisphenol A system and this may be used in combination with a methylene compound bearing at least one electron withdrawing substituent derived from siloxane segments. Desirably, the methylenic compound bears two electron withdrawing groups and may be monofunctional, difunctional or polyfunctional with respect to such methylenic groups. By reference to FIG. 4, the methylene compound is the biscyanoacetate of neopentyl glycol, a branched aliphatic hydrocarbon.

In additional aspects, the present invention provides novel compositions of matter, including those embraced within structures I and II.

More specifically, the novel compositions of matter may be seen with reference to the imine shown below in structure IA, where $R_1$-$R_2$ are each independently selected from hydrogen, alkenyl, or alkynyl; and A-B are each independently selected from linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from a linear, branched or cyclic hydrocarbon with or without one or more nitrogen-containing substituents thereon, a heterocyclic, an aromatic or an organosiloxane group or part thereof or linkage; and

$R_3$ is selected from a hydrocarbon, a heterocyclic, an aromatic or an organosiloxane group or linkage; and w is 1-100; y is 1-100 and z is 0-100, such as where w is equal to 2, y equal to 1 and z equal to 1, $R_3$ in structure I may also be substituted with polymerisable functionality, such as for instance by a vinyl group, a (meth)acrylate group, a styryl group or an epoxide group, $R_3$ in structure I may also be attached to a support that may be a solid support or a liquid support. Examples of solid supports include silica, aluminum oxide, zeolites, or glass, whereas examples of liquid supports include a liquid polymer having one or more functional groups. For instance, $R_3$ may be linked to or be part of a support material through a linker formed as an O, ester, reverse ester, S, thioester, reverse thioester, amide, reverse amide, urea, urethane, or reverse urethane.

And for the iminium salt shown below in structure IIA:

where $R_1$-$R_2$ are each independently selected from hydrogen, alkenyl, or alkynyl;

A-B are each independently selected from linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from a linear, branched or cyclic hydrocarbon with or without one or more nitrogen-containing substituents thereon, a heterocyclic, an aromatic or an organosiloxane group or part thereof or linkage; and $R_3$ is selected from a hydrocarbon, a heterocyclic, an aromatic or an organosiloxane group or linkage;

w is 1-100; y is 1-100 and z is 0-100; and

X is an anion.

Desirably, w is equal to 2, y equal to 1 and z equal to 1.

The iminium salt of structure IIA desirably is in the form of an ionic liquid.

And as with structure IA, $R_3$ in structure IIA may be substituted with polymerisable functionality, such as for instance a vinyl group, a (meth)acrylate group, a styryl group or an epoxide group.

Likewise $R_3$ in structure IIA may also be attached to a support, such as those supports described above in connection with structure IA.

And X in structure II is an anion selected from anions, such as $PF_6$, $BF_4$, $AsF_6$, $SbF_6$, $Tf_2N$, $(CN)_2N$, triflate, camphorsulfonate, benzenesulfonate, dodecylbenzene sulfonate, saccharinate, acesuifamate, $MF_6$, where M is Nb or Ta, nitrate, $CF_3CO_2$, halide, phosphate, perchlorate or $CH_3SO_3$, the latter of which may be the same or different to the anion counterbalancing charge for the organic cation. See also Davis et al., in *Ionic Liquids in Synthesis*, P. Wasserchied and T. Welton, eds., Wiley-VCH Verlag GmbH & Co. KGaA, Chapter (2002). (See e.g. International Patent Publication No. WO 03/086605 A2.)

In addition, the anion X may also be selected from peroxomonosulfate ($HSO_5^-$), 0.5 persulfate ($S_2O_8^{2-}$), or 0.5 peroxidiphosphate ($H_2P_2O_8^{2-}$), the latter of which being a known initiator for redox polymerization [Sarac, *Prog. Polym. Sci.*, 24, 1149 (1999)]. Reference to the figures may be useful to appreciate the chemical reactions that are marshaled to carry out further the present invention, which is described in more detail below and in the Examples section that follows below.

Figure 1:
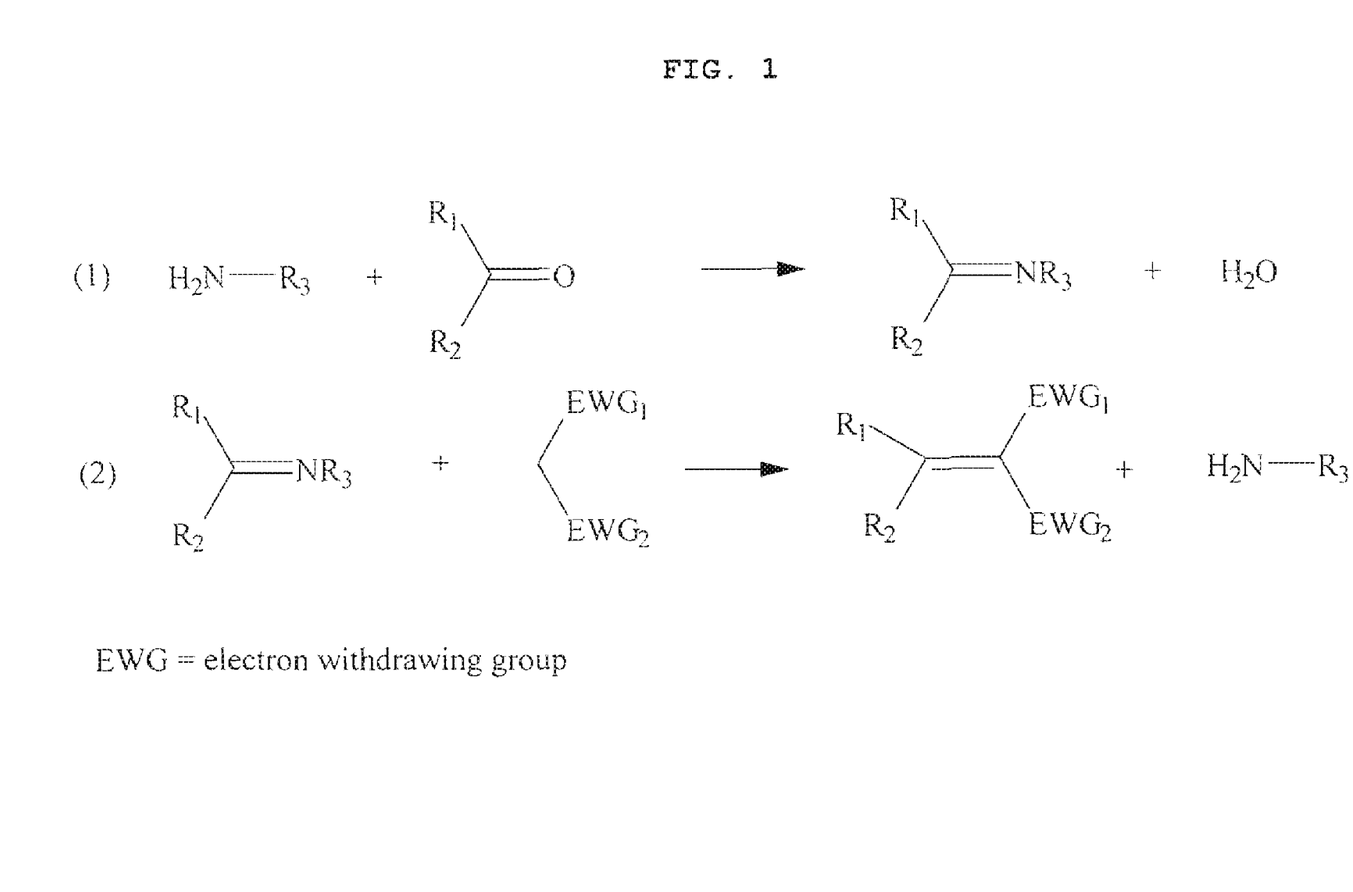
FIG. 1 depicts a general scheme by which electron deficient olefins may be prepared from a t-alkyl imine (shown in the second step), which itself is prepared in the preceding step.
Figure 2:
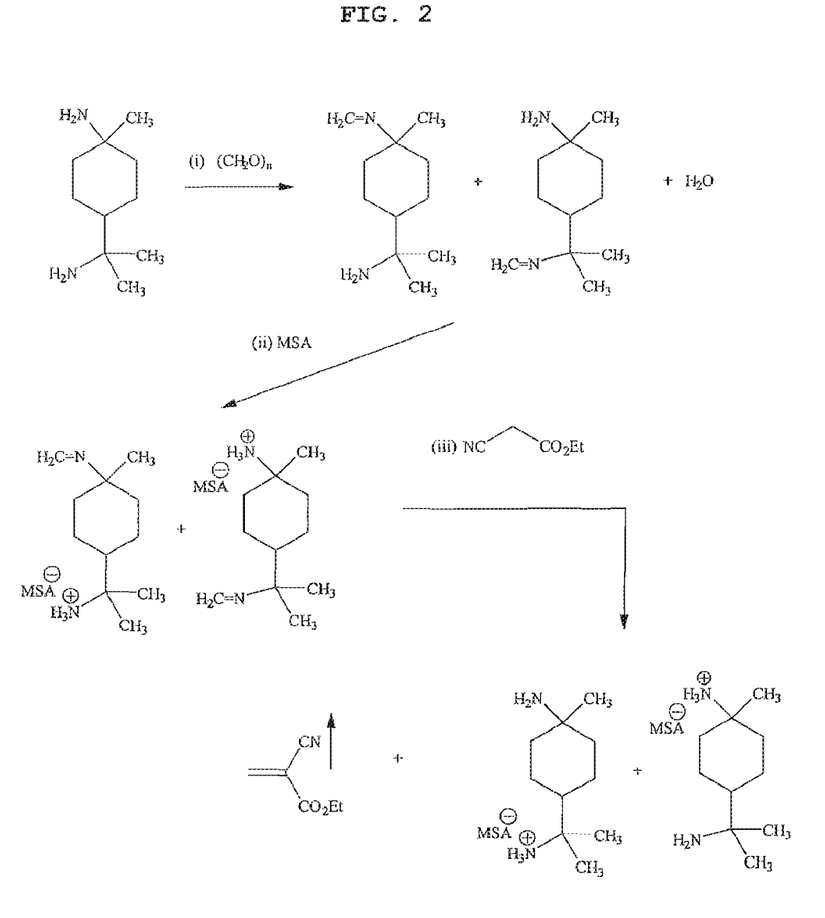
FIGS. 2 and 3 depict synthetic schemes by which 2-cyanoacrylate esters may be prepared from t-alkyl imines [having ammonium (FIG. 2) or imidazolium (FIG. 3) salt functionality as well], according to the present invention.
Figure 3:
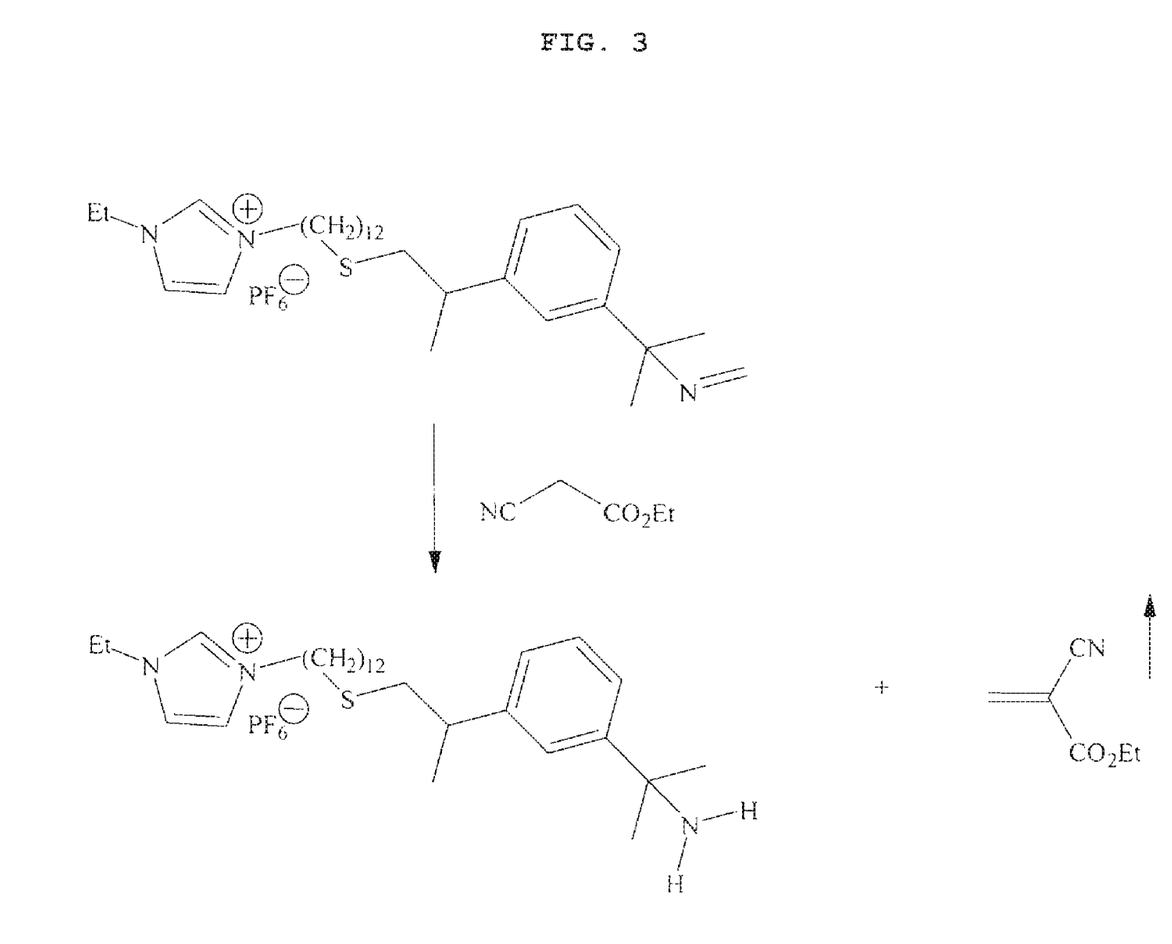

Thus, with reference to FIG. 1, as an initial reactant, is an aldehyde compound having the structure $R_1R_2C=O$, where $R_1$ is hydrogen and $R_2$ is a hydrogen, vinyl or propargyl. The aldehyde compound may be an aldehyde itself or a source of an aldehyde, such as one that yields an aldehyde like formaldehyde under appropriate reaction conditions. The aldehyde compound in a desirable embodiment includes formaldehyde (or a source thereof, such as paraformaldehyde, formalin, or 1,3,5-trioxane) or vinyl aldehydes, such as acrolein. In FIG. 2, paraformaldehyde is shown as $(CH_2O)_n$ where n>1.

As a reactant with such an aldehyde is a primary amine. Primary amines attached to a carbon bearing no alpha protons are particularly desirable, such as t-alkyl primary amines. Rohm and Haas Co., Philadelphia, Pa has sold commercially for a number of years a series of t-alkyl primary amines, which are designated as PRIMENE-brand amines.

For instance, t-alkyl primary amines available from Rohm and Haas include PRIMENE 81-R and PRIMENE JM-T. These PRIMENE-brand t-alkyl primary amines have highly branched alkyl chains in which the amino nitrogen atom is attached directly to a tertiary carbon. These t-alkyl primary amines consist of mixtures of isomeric amines, with PRIMENE 81-R consisting of an isomeric mixture with $C_{12}$-$C_{14}$ carbon branches and saving an average molecular weight of 185 and PRIMENE JM-T consisting of an isomeric mixture with $C_{16}$-$C_{22}$ carbon branches and having average molecular weight of 269.

PRIMENE MD, also known as menthanediamine (1,8-diamino-p-menthane) or (4-amino-α,α-4-trimethyl-cyclohexanemethanamine, CAS No. 80-52-4), is a primary alicyclic diamine, in which both amino groups are attached to tertiary carbon atoms. Like other t-alkyl primary amines, menthanediamine is somewhat less reactive than similar straight chain diamines. Yet another PRIMENE, PRIMENE TOA (1,1,3,3-tetramethylbutylamine) has tertiary alkyl chains and a molecular weight of 129.

In FIG. 1 equation (2) if $EWG_1$ is nitrile and $EWG_2$ is acetate, for instance, cyanoacrylic ester is formed with a primary amine as a byproduct. When the primary amine byproduct is volatile (e.g., t-butyl amine), volatile electron deficient olefinic monomer (e.g., ethyl-2-cyanoacrylate) which forms during the exothermic reaction and under the conditions employed (e.g., addition of heat and vacuum) is incompletely removed from the reaction mixture, for example by vacuum distillation, before the primary amine byproduct initiates polymerization of the monomer.

However, if the initial imine molecule used in the reaction is itself designed to be substantially non-volatile under the conditions employed so that the byproduct primary amine derived therefrom and after reaction with an active methylene compound, such as a cyanoacetate, the volatile electron deficient olefinic monomer may be separated from the reaction mixture without subsequent initiation by the primary amine byproduct. In this situation, for instance, the optional separation step of the inventive processes may be performed.

Versions of hybrid imine-ammonium salts derived from PRIMENE MD (structure IV below) after condensation with paraformaldehyde are shown below in structures V(a) and V(b). Such hybrid imine-ammonium salts possess a structure, in which there exists an imine nitrogen attached to a tertiary carbon, and a quaternary ammonium salt in the same molecular.

IV

V (a)

V (b)

In the case of imines bearing an amine functionality as well, the amine functionality may be converted into ammonium salts by contacting them with an acidic species, such as trifluoroacetic acid, acetic acid, sulfuric acid, methane sulfonic acid, benzene sulfonic acid, dodecylbenzene sulfonic acid and camphor sulfonic acid [see e.g. J. March at 802, and references cited therein; see also M. B. Smith, Organic Synthesis, McGraw Hill International, Chemistry Series, 1302 (1994) and references cited therein and Abbaspour Tehrani and De Kimpe, Science of Synthesis, 27, 313 (2004), and references cited therein]. When there is more than one basic functionality in the same molecule further mixtures may result, for example, in the above case, iminium salts may also form.

Examples of such imines within structure I are shown below.

VI

VII

VIII

Such imines may be derived from appropriate primary amines attached to tertiary carbons (i.e., a carbon having no protons directly attached thereto). Examples of such amine or amine precursors are shown below.

For example, Brough et al., Chem. Eur. J., 12, 5134 (2006) describes the preparation of 2,4-diamino-2,4-dimethylpentane, shown below in structure A.

A

Trumbo et al., J. Appl. Polym. Sci., 82, 1030 (2001) describes the synthesis of the imine shown in structure B from the corresponding commercially available isocyanates, commonly known as m-TNT (and available commercially from Cytec Industries Inc.)

B

Following the procedure of Trumbo et al, for the conversion of isocyanate to amine, the siloxanes shown below in structures C1-C2 described by Zhou et al., *J. Polym. Sci.; Part A Polym. Chem. Ed.*, 29, 1097 (1991) may also be prepared with primary amines attached directly onto tertiary carbons attached indirectly to siloxanes and polysiloxanes.

C1

C2

Examples of aminoalkyloxysiloxanes in which a primary amine is attached to a tertiary carbon are described by Mehrotra et al., *J. Organometalic Chem.*, 24, 611 (1970) and are illustrated in structure D, where g is 0, 1 or 2 when h is 4, 3, or 2, respectively.

D

Hydrocarbon systems bearing primary amines attached to tertiary carbons have been described, for example, by Son et al., *J. Org Chem.*, 46, 323 (1981), an example of which is illustrated below in structure E

E

Q in structure E is shown below in structures E1 and E2 where t is 2, 3, or 6 and the substituted aromatic system may be at the meta or para positions.

E1

E2

Morpholinone-derived molecules have been described in International Patent Publication No. WO 9914206 A1, an example of which is shown below as structure F.

F

Bifunctional primary amines on tertiary carbons have been described by Semkus, *J. Amer. Chem. Soc.*, 69, 1380 (1947) and in U.S. Pat. Nos. 2,415,046, 2,413,249, 2,413,250, and 2,363,464, representative examples of which are shown below in structures G and H.

G

H

Imines of the appropriate structure may be prepared by transforming these amine systems by reaction with a source of formaldehyde to yield imines embraced by structure I. And of course iminium salts embraced by structure II may be prepared by contacting the imine with an appropriate acid as set forth herein.

The imines, whether or not bearing ammonium salt functionality or whether or not they are tethered to a support, are then reacted with compounds containing a methylene linkage having at least one, desirably two, electron withdrawing substituent attached thereto. In these compounds, the electron withdrawing substituent is selected from nitrile, carboxylic acids, carboxylic esters, sulphonic acids, ketones or nitro.

In a desirable embodiment, these compounds have two or more electron withdrawing substituents, which may be the same or different, such as nitrile and carboxylic acid ester in this case, a cyanoacrylate. Of course, the reactivity of these compounds in large part depends on the degree of electron withdrawing capability, and the number, of the substituents on the active methylene carbon. Representative examples of these compounds include malonic acid and its esters, cyanoacetic acid and its esters. A particularly desirable example is the ethyl ester of cyanoacetic acid.

Structure IX below illustrates the electron deficient olefinic products that would result from reaction with an imine, using the above reactants.

IX

Here, when a source of formaldehyde is used, n is 0 in structure IX and a methylenic compound results with X and Y being nitrile, carboxylic acid, or carboxylic acid esters; X being nitro and Y being carboxylic acid ester; or X being nitrile and Y being carboxylic acid ester, the latter combination giving rise to 2-cyanoacrylates using alkyl cyanoacetates as a substrate, for example. When acrolein is used, n is 1 and the same combinations of X and Y can apply in structure IX.

The electron deficient olefin so formed may be a variety of olefins having at least one electron withdrawing group attached thereto. In a desirable embodiment, as noted above with respect to the second reactant, the electron deficient olefin so formed will have two or more electron withdrawing groups attached thereto, which may be the same or different. Particularly desirable products have two electron withdrawing groups attached thereto that are different, such as 2-cyanoacrylate esters.

Representative examples of 2-cyanoacrylate esters so formed by the inventive processes include methyl, ethyl, n-propyl, i-propyl, propargyl, n-butyl, i-butyl, n-pentyl, n-hexyl, 2-ethylhexyl, n-octyl, n-nonyl, oxononyl, n-decyl, n-dodecyl, allyl, ethynyl, 2-butenyl, cyclohexyl, phenyl, phenethyl, tetrahydrofurfuryl, chloroethyl, 2,2,2-trifluoroethyl, hexafluoroisopropyl, methoxymethyl, methoxyethyl, methoxybutyl, ethoxyethyl, propoxyethyl, butoxymethyl, butoxyethyl or dimethyl siloxane esters of 2-cyanoacrylic acid.

The electron deficient olefin may also be a compound having one end terminating with a cyanoacrylate, cyanopentadienoate, or alkylene derived from dimalonate or malononitrile and another end terminating with a group selected from branched and unbranched alkyl esters, esters containing aromatics and heterocyclic nuclei, acrylates, cyanoacrylates, siloxanes, blocked and unblocked isocyanates, anhydrides, silanes, vinyls, or acetylenes.

The reaction may proceed with or without heating or cooling, depending of course on the specific reactants and the scale of the reaction. Decomposition of the source of formaldehyde, e.g., paraformaldehyde, may occur under gentle heating up to a temperature of 70° C., to liberate formaldehyde in situ in the reaction medium. The temperature may be reached through an external heating element or internally by means of the exotherm that may be generated, depending of course on the identity of the reactants. The temperature of the reaction should be controlled however to accommodate any such exothermic processes.

Stabilizers may be included in one or both parts of the inventive adhesive system to tailor the reactivity of the two parts of the system, as may be desired. Suitable stabilizers include free radical stabilizers and acidic stabilizers.

For example, free radical stabilizers include hydroquinone, pyrocatechol, resorcinol or derivatives thereof, such as hydroquinone monoethyl ether, or phenols, such as di-t-butylphenol or 2,6-di-t-butyl-p-cresol, 2,2'-methylene-bis-(4-methyl-6-t-butylphenol), bisphenol A, dihydroxydiphenylmethane, and styrenized phenols.

For example, acidic stabilizers include sulfuric acid, hydrochloric acid, sulfonic acids, such as methane, ethane or higher sulfonic acids, -toluene sulfonic acid, phosphoric acid or polyphosphoric acids, silyl esters of strong acids, such as trialkyl chlorosilanes, dialkyl dichlorosilanes, alkyl trichlorosilanes, tetrachlorosilane, trialkyl silylsulfonic acids, trialkyl silyl-p-toluene sulfonates, bis-trialkyl silylsulfate and trialkyl silylphosphoric acid esters.

The amount of either stabilizer used to stabilize the electron deficient olefin prepared by the inventive processes is well known to those of ordinary skill in the art, and may be varied depending on the properties of the resulting composition made from the so formed electron deficient olefin.

The following examples are intended to illustrate but in no way limit, the present invention.

EXAMPLES

PRIMENEs TOA, 81-R and JM-T were used to prepare imines by reaction of the amines with stoichiometric equivalents of paraformaldehyde and removal of water of condensation. All imines formed were distillable liquids and existed in stable monomeric imine forms as confirmed by $^1$H NMR 60 MHz (CDCl$_3$) 2H D 7.16, 7.09 ppm (TOA imine); 2H s (br) 7.45 ppm (81-R imine) and (CD$_3$COCD$_3$) 2H 6.86 ppm (JM-T imine) and FTIR (1650 cm$^{-1}$ for each).

A portion of these PRIMENE imines were made into iminium salts by reaction with a stoichiometric quantity of methane sulfonic acid in a solventless reaction.

Example 1

Neopentyl biscyanoacetate was prepared by azeotropic esterification of 1.05 mol of cyanoacetic acid with 1.0 molar equivalent of neopentylglycol in 50% total concentration in a xylene solvent, without the aid of an esterification catalyst. The reaction was stopped when the theoretical quantity of water was azeotropically removed and collected in a Dean Stark trap. The liquid biscyanoacetate was further purified by vacuum distillation (Bp: ~176-180° C. at 1 mbar) and its structure confirmed by $^1$H NMR and FTIR [Renner et al., *J. Polym Sci., Polymer Chemistry Ed.*, 23, 2341 (1985)].

PRIMENE MD diimine was prepared by direct reaction of paraformaldehyde solid prills (2 equivalents) with PRIMENE MD (1 equivalent). The mixture was stirred together without solvent overnight. Water was removed by treatment with sodium sulphate, and the mixture was distilled under vacuum to provide a neopentylglycol biscyanoacetate, the structure of which was confirmed by $^1$H NMR and FTIR.

One equivalent of the neopentylglycol biscyanoacetate in one part was admixed with one equivalent of the difunctional diimine in a second part, and a polymerised mass was observed to form.

Example 2

The iminium salt of PRIMENE MD was prepared by treating the PRIMENE MD diimine from Example 1 with two equivalents of methane sulfonic acid. The iminium salt was observed to be a viscous ionic liquid with little or no odour.

The PRIMENE MD diiminium salt thus prepared was mixed in a 1:1 ratio with neopentyl biscyanoacetate (from Example 1) in a sin container to form a one part system. The system remained unreactive, until it was exposed to a temperature of 100° C. for a few minutes, after which time it was transformed into a polymerised mass.

Example 3

The following scheme describes a general procedure for the reaction of PRIMENE MD diimine and biscyanoacetate:

PRIMENE MD diimine (10 mmol) in one part and a series of biscyanoacetates (10 mmol) in a second part were mixed at room temperature, the reaction was observed to be exothermal (for details and the identity of the biscyanoacetate, see Table 1). The temperature indicated in Table 1 represents the maximum exotherm recorded after mixing the imine type compound with the acetate type compound together at room temperature. After cooling from the maximum temperature reached after mixing to room temperature, the mixture turned to a polymerized mass (Table 1).

TABLE 1

| Biscyanoacetate | Polymer | Temp (° C.) |
|---|---|---|
| $CNCH_2CO_2(CH_2)_2O_2CCH_2CN$ | Yellow solid | 104.2 |
| $CNCH_2CO_2(CH_2)_3O_2CCH_2CN$ | Yellow viscous | 88.5 |
| $CNCH_2CO_2(CH_2)_5O_2CCH_2CN$ | Red viscous | 76.3 |
| $CNCH_2CO_2(CH_2)_9O_2CCH_2CN$ | Yellow solid | 39.6 |
| NCH₂COC—O—C(CH₃)₂—O—COCH₂CN (neopentyl) | Pale yellow solid | 96.6 |
| NCH₂COCO—(C≡C)—OCOCH₂CN | Brown solid | 131.9 |
| NCH₂COCO—(CH=CH)—OCOCH₂CN | Brown solid | 102.5 |

Example 4

Here, t-butylimine in one part and a series of biscyanoacetates in a second part may be reacted at room temperature in a two to one ratio as follows:

Table 2 below shows the identity of the biscyanoacetates used, together with reaction conditions.

TABLE 2

| Biscyanoacetate | Polymer | Temp (° C.)/ Time (min) |
|---|---|---|
| $CNCH_2CO_2(CH_2)_2O_2CCH_2CN$ | Yellow solid | 91.2 (3.5) |
| $CNCH_2CO_2(CH_2)_3O_2CCH_2CN$ | Pale yellow gel | 82 (3.5) |
| $CNCH_2CO_2(CH_2)_5O_2CCH_2CN$ | Viscous yellow gel | 83 (3.5) |
| $CNCH_2CO_2(CH_2)_9O_2CCH_2CN$ | Viscous red gel | 47.4 (2) |
| NCH₂COC—O—C(CH₃)₂—O—COCH₂CN (neopentyl) | Yellow solid | 84 (1.5) |
| NCH₂COCO—(C≡C)—OCOCH₂CN | Red viscous gel | 96.4 (1) |
| NCH₂COCO—(CH=CH)—OCOCH₂CN | Red viscous gel | 38 (2) |

Example 5

Freshly distilled t-butylimine (63-64° C., 4.25 g) in one part and ethyl cyanoacetate (50 mmol, 5.65 g) in a second part were mixed at room temperature. An exotherm was observed during the reaction, with the temperature reaching between 120-130° C. The reaction mixture was observed to turn into a viscous yellow gel.

Example 6

The reaction of PRIMENE MD diimine with ethyl cyanoacetate proceeded as follows:

PRIMENE MD diimine (20 mmol, 3.88 g) in one part and ethyl cyanoacetate (40 mmol, 4.52 g) in a second part were mixed at room temperature. An exotherm was observed during the reaction, with the temperature reaching between 90-100° C. The reaction mixture was observed to turn into a viscous gel, which after cooling formed a hard mass.

What is claimed is:

1. A two part adhesive system comprising:
   A. a first part comprising an imine within structure

I wherein K is wherein $R_1$-$R_2$ are each independently selected from the group consisting of hydrogen, alkenyl, and alkynyl; and A-B are each independently selected from the group consisting of linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from the group consisting of a linear, branched and cyclic hydrocarbon with or without one or more nitrogen-containing substituents thereon, a heterocyclic, an aromatic or an organosiloxane group or part thereof or linkage; and $R_3$ is selected from the group consisting of a hydrocarbon, a heterocyclic, an aromatic and an organosiloxane group or linkage;

w is 1-100; y is 1-100 and z is 0-100, wherein when more than one of K, E or $R_3$ are present, each instance thereof is defined independently from the other instance(s); and B. a second part comprising a compound containing at least one methylene linkage having at least one electron withdrawing substituent attached thereto, wherein the electron withdrawing substituent is selected from the group consisting of nitrile, carboxylic acids, carboxylic esters, sulphonic acids, ketones and nitro.

2. The adhesive system of claim 1,
   further comprising in the first part an imine within structure III

III wherein $R_4$-$R_5$ are each independently selected from the group consisting of hydrogen, alkenyl, and alkynyl; and $R_6$ is a hydrocarbon moiety comprising a tertiary carbon which is attached to the N atom, wherein the tertiary carbon atom is attached to or forms part of one or more substituents selected from linear, branched, or cyclic alkyl or alkenyl groups, or one or more taken together form a cyclic or polycyclic (as the case may be) alkyl or alkenyl structure, which itself (themselves) may have substituents attached thereto.

3. The adhesive system of claim 1, wherein the compound contains a methylene linkage having at least two electron withdrawing substituent attached thereto.

4. The adhesive system of claim 1, wherein in structure I n is 2.

5. The adhesive system of claim 1, wherein in structure I $R_3$ comprises a N-containing linkage or group, a P-containing linkage or group, or a S-containing linkage or group.

6. The adhesive system of claim 1, wherein in structure I $R_3$ comprises a polyorganosiloxane linkage or group.

7. A process for the preparation of a reactive adhesive composition, steps of which comprise:
   (a) providing in one part an imine within structure I according to claim 1;
   (b) providing in a second part a compound containing at least one methylene linkage having at least one electron withdrawing substituent attached thereto, wherein the electron withdrawing substituent is selected from the group consisting of nitrile, carboxylic acids, carboxylic esters, sulphonic acids, ketones and nitro; and
   (c) mixing the first part and the second part under appropriate conditions and for a time sufficient to yield an adhesive composition comprising a reactive electron deficient olefin.

8. The adhesive system of claim 1, wherein w is 1 and $R_3$ in structure I is substituted with polymerisable functionality.

9. The adhesive system of claim 1, wherein $R_3$ in structure I is attached to a solid support.

10. The adhesive system of claim 9, wherein the solid support is selected from the group consisting of silica, aluminum oxide, zeolites, and glass.

* * * * *